Inventor
William A. Williams

Patented May 17, 1949

2,470,669

UNITED STATES PATENT OFFICE 2,470,669

DRIVING GEAR OF MULTICYLINDER RECIPROCATING-PISTON ENGINES

William Arthur Williams, London, England

Application February 20, 1946, Serial No. 648,938
In Great Britain September 5, 1944

Section 1, Public Law 690, August 8, 1946
Patent expires September 5, 1964

10 Claims. (Cl. 121—117)

1

This invention relates to the driving gear of multi-cylinder reciprocating piston engines and it has for its object to provide an improved construction of crankshaft mechanism which is exceptionally efficient and which is particularly suitable for employment in multi-cylinder engines.

It is a further object of the invention to provide an improved engine of the general form described in my British Patent Specification No. 533,047 in which a number of mutually parallel pistons are connected with a cross-head member having an oblique cam track engaged by a follower upon a crankpin so that reciprocation of the pistons and cross-head member brings about rotation of said crankpin.

In a multi-cylinder engine comprising a plurality of pistons slidable within corresponding mutually parallel cylinder bores and coupled with a cross-head member having a cam track lying at an inclination to the cylinder axes, said cam track being connected with a rotatable crankpin so that as the latter moves around its orbit the cross-head member and pistons reciprocate as one, the invention is characterised by the fact that the crankpin is connected with the cam track by a carriage device comprising a body which is pivoted to the crankpin and which carries a plurality of rollers engaging the cam track at spaced positions.

Preferably the rollers of the carriage device are disposed at opposite sides of the crankpin axis, the body of the carriage device conveniently being elongated and the crankpin being disposed substantially halfway along the length of said body. The distance of the crankpin axis from the surface of the cam track can advantageously be substantially equal to the radius of the crankpin orbit thus where the axes of the crankpin and the rollers all lie in a common plane the diameter of the rollers of the carriage are preferably substantially equal to the diameter of the crankpin orbit.

The cross-head may be formed with a plurality of substantially flat treads which are engaged by corresponding flat surfaces upon the ends of the pistons, the pistons being connected with the cross-head, each by a pair of link members disposed one on each side of the corresponding tread, said link members having a pin and transverse slot connection at one end to allow the piston to move laterally relative to the cross-head member in aligning itself with its cylinder bore. If desired the cam track may be provided upon a flange formed along the edge of the cross-head member, the carriage device being provided with retaining

2 means which engage the rear surface of said flange to prevent the carriage device from moving away from the cam track to a substantial extent. The pistons are preferably hollow and are closed at their ends adjacent the cross-head member each by a plug which engages with said cross-head member. The pistons connected with the cross-head member can be of progressively increasing length, their working faces being disposed in a common plane at right angles to the cylinder axes, while their opposite outer ends lie in a line substantially parallel with the cam track.

Preferably the carriage body is divided in the plane of the cylinder axes, into two parts accommodating respectively the two end bearings of each roller. Thus the carriage body may have a recess, the inner part of which constitutes half a crankpin bearing, the other half of said bearing being formed upon a block which is secured within the recess, the block being arranged to fit snugly between the sides of the recess in the carriage body so as to strengthen the body as regards bending due to the force transmitted between the cam track and the crankpin. The rollers may be recessed at their ends to accommodate annular bearing flanges upon the parts of the carriage body, the outer operative surfaces of the rollers thus being wider than the distance between the said bearing flanges. If desired the pistons and cylinders may form the sole guiding means for the cross-head member.

The invention is illustrated by way of example in the accompanying diagrammatic drawings in which.

Figure 1:
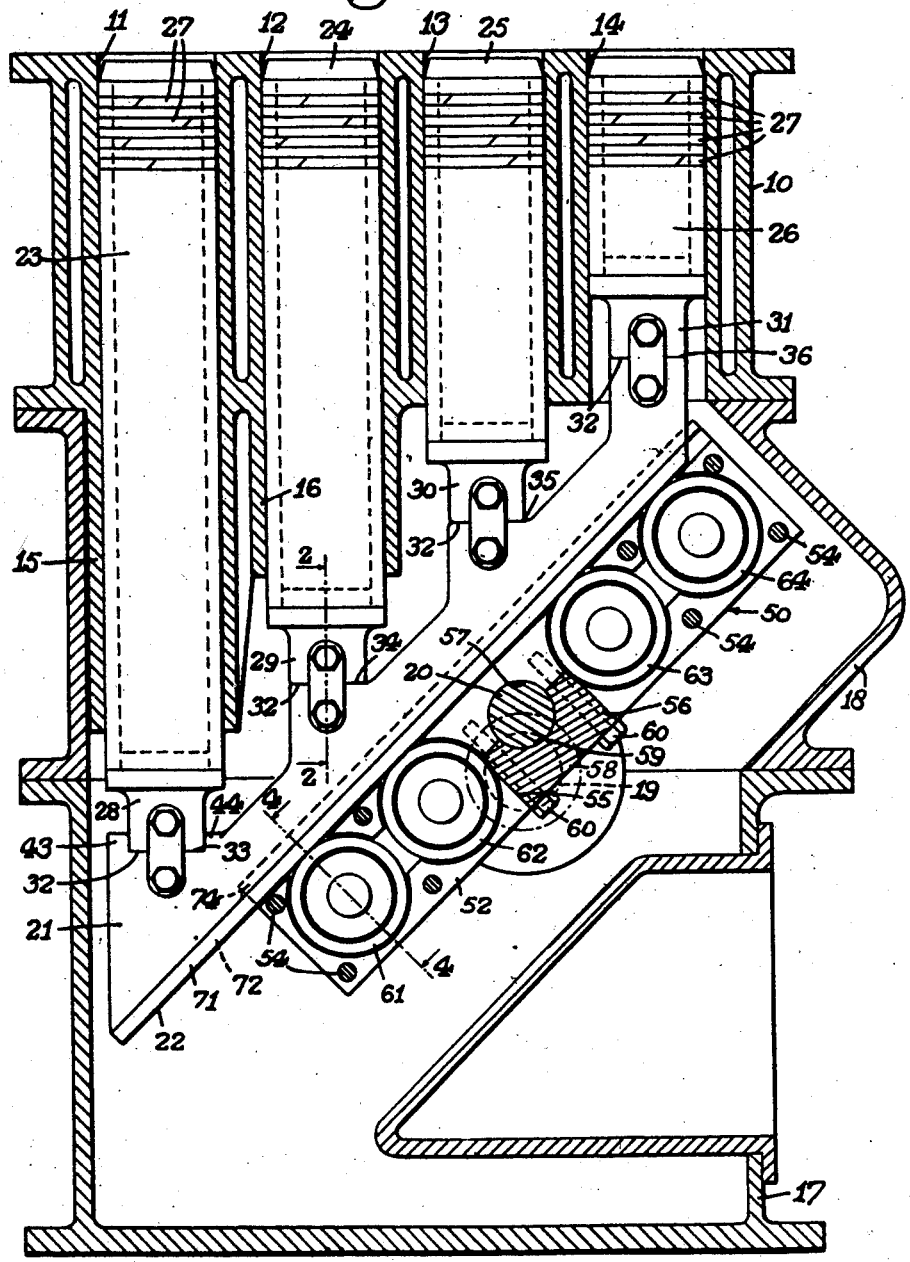
Figure 1 is a sectional elevation of a four-cylinder engine or engine unit.

The engine unit shown in Figure 1 comprises a water-jacketed cylinder block 10 having four mutually parallel cylinder bores 11, 12, 13 and 14, the cylinder bores 11 and 12 being lengthened downwards by forming the cylinder block 10 with tubular extensions 15 and 16. The cylinder block 10 is mounted upon a crank case comprising a base portion 17 and an upper portion 18, a horizontal crank shaft 19 having its axis in the plane of separation of the parts 17 and 18 and being formed with a crankpin 20.

Figure 2:
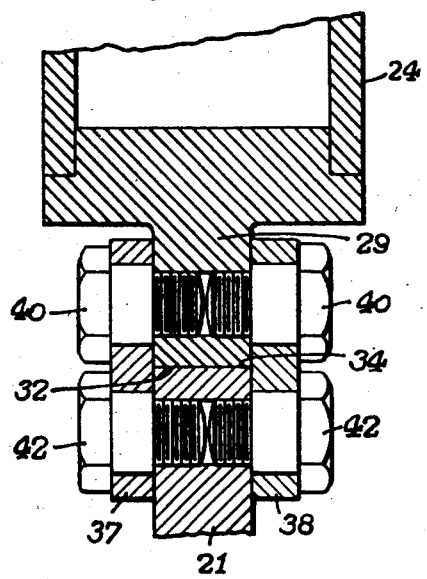
Figure 2 is a part sectional fragmentary view taken on the line 2—2 of Figure 1, drawn to an enlarged scale and showing the link connection device between a piston and the cross-head member.
Figure 3:
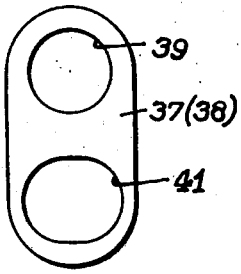
Figure 3 is an elevation of one of the links shown in Figure 2.

Disposed within the crank case 17 and 18 is a cross-head member 21 which is formed along its under side with a cam track 22 arranged at a substantial inclination, preferably 45° with respect to the axes of the cylinder bores 11—14. The cross-head member 21 is connected positively with four pistons 23, 24, 25 and 26 which are arranged to reciprocate in the bores 11, 12, 13 and 14 respectively and which are provided at their upper ends with the usual piston rings indicated at 27. Each of the pistons 23—26 is hollow and is in fact of inverted cup shape, the pistons having their lower ends closed by means of flanged plug members 28, 29, 30 and 31 respectively, these being secured in position by bolts or screws (not shown). The lower part of each plug member 28—31 is formed with a flat surface which is indicated at 32 and is arranged to bear against a corresponding horizontal "tread" upon the cross-head member 21, said tread being shown at 33, 34, 35 and 36. The pistons 23—26 are positively connected with the cross-head member 21 each by a pair of links 37 and 38 which are arranged in the manner shown in Figures 2 and 3. Each of the links has at its upper part a hole 39 for the reception of a shouldered bolt 40 by which it is secured to the corresponding piston plug (say 29) while at its lower part the link has a transversely extended hole or slot 41 by which said link is arranged to be secured to the cross-head member 21 by a shouldered bolt 42. The length of the links 37 and 38 is such that the flat surface 32 upon the bottom of the piston is retained in smooth sliding engagement with the corresponding tread (say 34) upon the cross-head member 21, the slots 41 enabling the piston to move slightly in a lateral direction so as to slide truly within the corresponding cylinder bore. In the case of the longest piston 23, however, the cross-head member 21 is formed with upwardly extending shoulders or abutments 43 and 44 at the respective ends of the tread 33, thus positively locating the cross-head member 21 with respect to the piston 23 so that the latter serves as an efficient guide for locating the cross-head member 21 throughout its reciprocating movement. It is found that the provision of the flat treads 34, 35 and 36 effectively maintains the cross-head member 21 at the correct inclination for which it is designed. It will of course be understood that in Figure 1 the usual cylinder head, valve gear and ignition or injection means of the engine have been omitted as these form no part of the present invention and can be of any form to suit the type of engine to which the improved crank mechanism is applied.

The cross-head 21 is operatively connected with the crankpin 20 and the crank shaft 19 by means of a carriage device which is indicated generally at 50. It comprises a carriage body which is formed in two parts 51 and 52 as will be seen in the cross sectional view constituting Figure 4, the parts 51 and 52 being arranged to abut together in a vertical plane 53 coinciding with the axes of the cylinders 11—14. The two parts are held together firmly by bolts 54 and at their inner part they are both cut away to form a substantially U-shaped recess, the side walls of which are indicated at 55 and 56. The "bottom" part 57 of this recess is of semi-cylindrical shape and is arranged to fit around the upper part of the crankpin 20 so as to provide a rotatable bearing. A block 58 is fitted snugly into the recess defined by the walls 55 and 56, said block being shaped at its upper part with a semi-cylindrical surface 59 arranged to fit against the lower part of the crankpin 20 so as to complete the bearing surface. The block 58 is secured in position by bolts 60. It will thus be seen that the carriage body 51, 52 is snugly rotatable upon the crankpin 20 and it can be readily assembled on said crankpin owing to the provision of the removable block 58.

Figure 4:
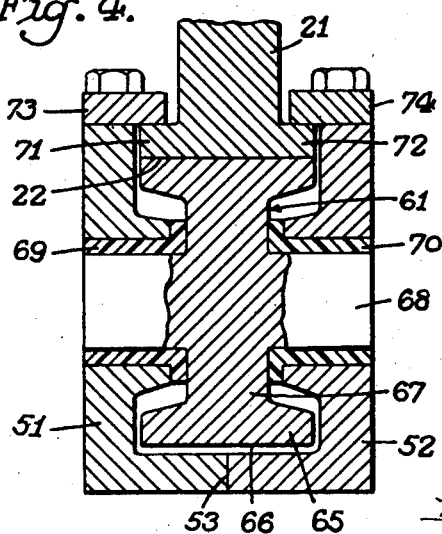
Figure 4 is a fragmentary sectional view through the carriage, taken on the line 4—4 of Figure 1 and drawn to an enlarged scale.

At its two end parts the carriage body 51, 52 has its mating surface hollowed for the reception of four bearing rollers 61, 62, 63 and 64, these rollers being arranged to run upon the cam track 22 and being each mounted in the manner shown in Figure 4, which of course shows a section through the roller 61. The roller is shaped with a rim portion 65 having an outer working surface 66 which is substantially wider than the centre part 67 of the roller. The latter has an integral spindle 68 projecting from both sides into a pair of bearing bushes 69 and 70 mounted in the body parts 51 and 52 respectively; these bushes constitute tubular bearings extending inwards as far as the centre part 67 of the roller, i. e. further inwards than the corresponding edge of the working surface 66 so that by this means the carriage is made very compact and at the same time each roller is provided with a wide peripheral working surface and with sturdy central bearings of generous area.

It will be seen in Figure 4 that the lower part of the cross-head member 21 is enlarged in width to form a relatively wide cam track 22, the enlargement constituting a pair of longitudinal flanges 71 and 72. These are used for retaining the carriage member 50 at all times in engagement with the cross-head member 21 and for this purpose the parts 51 and 52 of the carriage body are fitted along their upper edges with strips 73 and 74 respectively arranged to fit snugly upon the flanges 71 and 72. It should be pointed out that during the normal running of the engine the carriage member 50 always tends to remain in firm engagement with the cross-head member 21, as, during the power stroke, the pistons 11—14 press the carriage member 50 downwards while on the upward stroke the crank shaft 19, through the carriage body 50, presses the pistons upwards; the strips 73, 74 however are usually required to bring about the reciprocation of the pistons during starting.

In order to secure the smoothest and most efficient action of the crank mechanism it is desirable that the carriage device 50 should be designed so that the distance of the axis of the crankpin 20 from the cam track 22 measured at right angles to the latter should be substantially equal to the radius of the orbit of the crankpin i. e. the distance of the crankpin axis from the axis of the crank shaft 19. Where the axes of the rollers 61—64 all lie in a plane which contains also the axis of the crankpin 20 it follows that the diameter of the rollers should be equal to the diameter of the crankpin orbit in order to satisfy the above condition.

Figure 5:
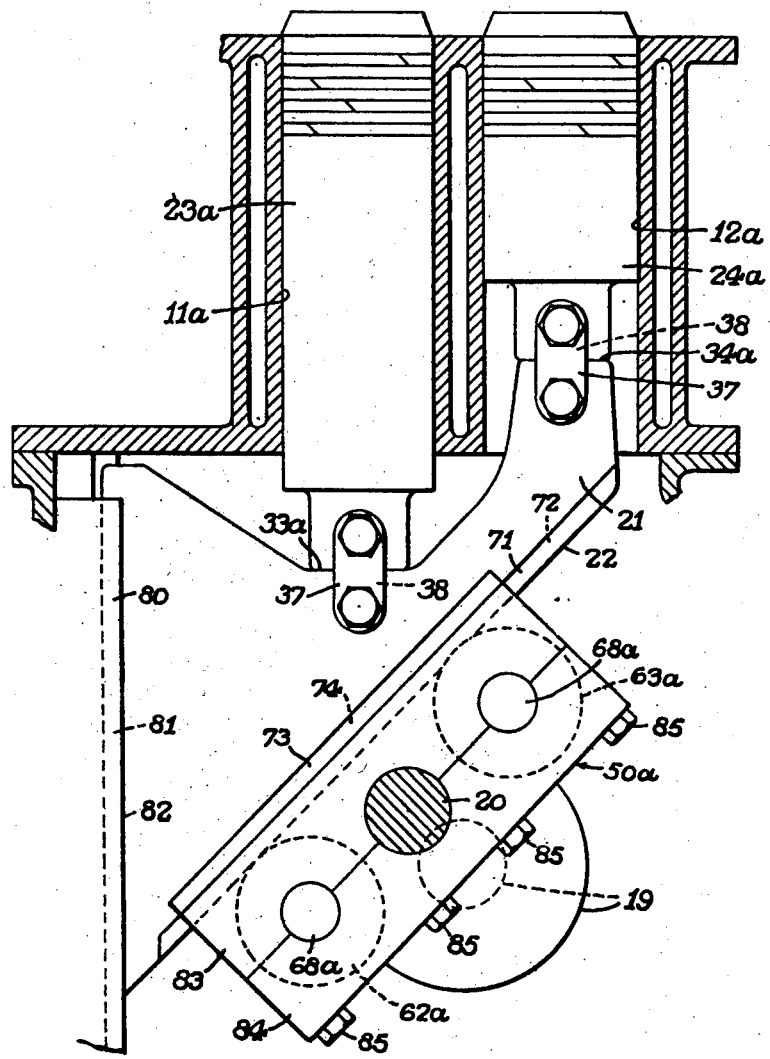
Figure 5 is a fragmentary view showing in elevation another arrangement of engine in which the cross-head member is guided independently of the pistons.

In the modified form of engine crank mechanism shown in Figure 5, side thrust on the cross-head member 21 due to the wedging action of the oblique cam track 22 is resisted by the engagement of the left hand edge 80 of the cross-head member slidable within a groove 81 formed in a guide member 82 constituting the side wall of the crank chamber. It will be seen that the crosshead member 21 is in this case roughly triangular in form so as to provide a relatively long guiding edge 80. Two pistons 23a and 24a are slidable within cylinder bores 11a and 12a and they have their lower ends connected as before with the cross-head member 21 by means of pairs of links 37 and 38 arranged to hold the lower ends of the pistons snugly in engagement with flat treads 33a and 34a upon the cross-head member 21. The crankpin 20 of the crank shaft 19 is again fitted with a carriage device indicated at 50a but in this instance the carriage device has only two rollers shown in dotted lines at 62a and 63a. The body of the carriage device 50a is moreover formed in two parts 83 and 84 which are joined together along the plane containing the axes of the rollers 62a and 63a and the crankpin 20, the parts being held together firmly by bolts 85. With this arrangement the two parts 83 and 84 can be hollowed out to receive the rollers 62a, 63a and also shaped to form divided bearings for the spindles 68a of said rollers; it has the disadvantage, however, that the thrust from the pistons is transmitted by the rollers to the lower part 84 of the carriage body and is thus imparted to the upper part 83 of the crankpin 20 through the medium of the bolts 85. The carriage device 50a is maintained in working contact with the cross-head member 21 by longitudinal strips 73 and 74 which are arranged to engage with the upper surface of corresponding flanges 71 and 72 formed upon the cross-head member 21.

Although the assemblies shown in Figures 1 and 5 may by the use of a flywheel be used as an engine, it will be understood that normally such assemblies would be used in pairs, the carriages being mounted on crankpins disposed 180° apart so as to obtain an effective balance.

It will be understood, moreover, that the arrangements which have been described are given merely by way of example and that various modifications are possible. Thus, any number of pistons can be provided in conjunction with a single cross-head member and a number of such cross-head members may be used in conjunction with a single crank shaft, separate crankpins suitably disposed being provided. The invention can, of course, be used in any type of reciprocating engine such as steam engines and internal combustion engines generally. In some multi-cylinder internal combustion engines it will be found to be advantageous and economical to shut off fuel from certain cylinders when the full power of the engine is not required.

What I claim is:

1. A multi-cylinder engine comprising a plurality of cylinders disposed side by side, a plurality of pistons slidable in said cylinders, a single crosshead member connected to said pistons and arranged to reciprocate as one therewith, a straight cam track formed on the crosshead member and extending at a substantial inclination to the cylinder axes, a single crankshaft, a crankpin on said crankshaft disposed adjacent the cam track, and a carriage device operatively connecting the crankpin with the crosshead member and which includes a body pivotally mounted on the crankpin and a plurality of rollers, pivoted upon the body to roll along the cam track as the pistons reciprocate.

2. An engine as defined in claim 1, wherein the distance of the crankpin axis from the cam surface is equal to the radius of the crankpin orbit.

3. An engine as defined in claim 1, wherein the pistons connected with the crosshead member are of progressively increasing length so that their front ends lie in a common plane perpendicular to the cylinder axes and their rear ends engage the inclined crosshead member.

4. An engine as defined in claim 1, wherein the carriage body comprises two parts abutting together in the plane of the cylinder axes, bearings for one end of each roller being formed in one part and bearings for the other end of each roller being formed in the other part.

5. An engine as defined in claim 1, wherein, the carriage body comprises a block fitting into a recess at the center of said body, a bearing for the crankpin being formed half in the body and half in the block.

6. A multi-cylinder engine comprising a plurality of cylinders disposed side by side, a plurality of pistons slidable in said cylinders, a single crosshead member connected to said pistons and arranged to reciprocate as one therewith, a straight cam track formed on the crosshead member and extending at a substantial inclination to the cylinder axes, a single crankshaft, a crankpin on said crankshaft disposed adjacent the cam track, and a carriage device operatively connecting the crankpin with the crosshead member and which includes a body pivotally mounted adjacent its center upon the crankpin, and a plurality of rollers pivoted to the body at both sides of the crankpin to engage the cam track at spaced positions and roll along said cam track as the pistons reciprocate.

7. An engine as defined in claim 6, wherein the body of the carriage is elongated and the crankpin is disposed substantially midway the length of said body.

8. A multi-cylinder engine comprising a plurality of cylinders disposed side by side, a plurality of pistons slidable in said cylinders, a single crosshead member connected to said pistons and arranged to reciprocate as one therewith, a plurality of substantially flat treads in descending succession down the crosshead member, each being in line with, and perpendicular to, the axis of one of the corresponding cylinders, a flat surface upon the corresponding piston engaging said tread, a straight cam track formed on the crosshead member and extending at a substantial inclination to the cylinder axes, a single crankshaft, a crankpin on said crankshaft disposed adjacent the cam track, and a carriage device operatively connecting the crankpin with the crosshead member.

9. An engine as defined in claim 8, wherein a pair of link members connect each piston with the crosshead member, said link members being disposed one on each side of the corresponding tread, a pin and transverse slot connection being provided at one end to allow the piston to move laterally relative to the crosshead member in aligning itself with the cylinder bore.

10. A multi-cylinder engine comprising a plurality of cylinders disposed side by side, a plurality of pistons slidable in said cylinders, a single crosshead member connected to said pistons and arranged to reciprocate as one therewith, a straight cam track formed on the bottom of the crosshead member and extending at a substantial inclination to the cylinder axes, a lateral flange formed along the whole length of the crosshead member extending the cam track laterally, a single crankshaft, a crankpin on said crankshaft disposed adjacent the cam track, and a carriage device operatively connecting the crankpin with the crosshead member and which includes a body pivotally mounted on the crankpin, a plurality of rollers pivoted on the body to roll along the surface of the cam track, and retaining means on the body engaging the upper surface of the lateral flange to keep the rollers in contact with the cam surface.

WILLIAM ARTHUR WILLIAMS.

REFERENCES CITED

The following references are of record in the file of this patent:

UNITED STATES PATENTS

| Number | Name | Date |
| --- | --- | --- |
| 1,823,681 | Felies | Sept. 15, 1931 |

FOREIGN PATENTS

| Number | Country | Date |
| --- | --- | --- |
| 322,090 | Germany | June 11, 1920 |